(12) United States Patent
Rivero Sesma

(10) Patent No.: US 12,451,018 B2
(45) Date of Patent: Oct. 21, 2025

(54) METHOD FOR ASSISTING WITH LANDING AN AIRCRAFT AND SYSTEM CONFIGURED TO EXECUTE THE METHOD

(71) Applicant: AIRBUS OPERATIONS (S.A.S.), Toulouse (FR)

(72) Inventor: Juan Rivero Sesma, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 47 days.

(21) Appl. No.: 18/679,229

(22) Filed: May 30, 2024

(65) Prior Publication Data
US 2024/0404416 A1    Dec. 5, 2024

(30) Foreign Application Priority Data
May 31, 2023  (FR) ...................................... 2305454

(51) Int. Cl.
*G08G 5/54* (2025.01)
*G06F 18/24* (2023.01)
*G06F 18/2413* (2023.01)
*G06T 7/70* (2017.01)
*G06V 20/17* (2022.01)

(52) U.S. Cl.
CPC ......... *G08G 5/54* (2025.01); *G06F 18/24137* (2023.01); *G06T 7/70* (2017.01); *G06V 20/17* (2022.01); *G06T 2207/10032* (2013.01); *G06T 2207/30184* (2013.01)

(58) Field of Classification Search
CPC .............. B64D 45/08; G06F 18/24137; G06T 2207/10032; G06T 2207/30184; G06T 7/70; G06V 10/82; G06V 20/17; G06V 20/588; G08G 5/21; G08G 5/54
See application file for complete search history.

(56) References Cited

U.S. PATENT DOCUMENTS

| | | | |
|---|---|---|---|
| 10,388,029 B1* | 8/2019 | Taylor | G06T 7/75 |
| 12,254,646 B2* | 3/2025 | Leach | G06V 10/40 |
| 2010/0039294 A1 | 2/2010 | Feyereisen et al. | |
| 2020/0285828 A1 | 9/2020 | Virepinte et al. | |
| 2021/0319709 A1 | 10/2021 | Rose et al. | |
| 2022/0215571 A1* | 7/2022 | Leach | G06T 7/70 |
| 2022/0348353 A1 | 11/2022 | Toumazet et al. | |

FOREIGN PATENT DOCUMENTS

FR    3122408 A1    11/2022

OTHER PUBLICATIONS

French Search Report for FR 2305454, dated Nov. 22, 2023, 2 pages.

* cited by examiner

*Primary Examiner* — Tyler J Lee
(74) *Attorney, Agent, or Firm* — Nixon & Vanderhye P.C.

(57) ABSTRACT

A method for assisting with landing an aircraft is disclosed and configured to determine a number of probable theoretical positions (POS1, POS2, POS3) of the aircraft equal to the facing plurality of runways of a destination airport facility to reproject the runways into an image (F) obtained by a camera of the aircraft by means of a theoretical camera model (e.g. pinhole camera model), each reprojection being with reference to one of the determined theoretical positions (POS1, POS2, POS3); and to establish, for each of the reprojections, a consistency score making it possible to then deliver an estimated position (POSA) of the aircraft.

10 Claims, 5 Drawing Sheets

METHOD FOR ASSISTING WITH LANDING AN AIRCRAFT AND SYSTEM CONFIGURED TO EXECUTE THE METHOD

CROSS REFERENCE TO RELATED APPLICATION

This application claims priority to French Application Number FR 2305454, filed May 31, 2023, the entire contents of which is hereby incorporated by reference.

TECHNICAL FIELD

The present invention relates to a method for assisting with landing an aircraft on a runway of an airport facility. The invention more particularly relates to a method for determining the position of the aircraft with respect to a plurality of runways of a given airport facility, on the basis of a shot taken from the aircraft, and then of verification of the consistency of the determined position. The invention further relates to a system configured to execute the above-mentioned method for assisting with landing.

BACKGROUND

Current aircraft comprise many devices or systems for assisting with piloting, among which for example feature systems for assisting in carrying out an optimized descent to a destination airport facility or even systems that aim to avoid confusion, on arrival at the destination, between a destination runway and a taxiway parallel to this runway. Furthermore, not all airports are equipped with systems allowing automatic landing (e.g. ILS). Patent application FR3122408A1 discloses an automated system embedded in an aircraft that automatically compares regions obtained from a reprojection potentially containing airport runways into a shot taken from an aircraft with an image of a destination runway that was synthetically reconstructed, in the same spatial reference frame as that of the shot, on the basis of coordinates of characteristic points of these runways of the destination airport obtained from a database. This makes it possible to automatically identify all of the runways of the destination airport independently of any other global positioning system of the aircraft (e.g. GPS).

Many airport facilities comprise a plurality of runways, sometimes arranged parallel to one another, and a risk of confusion may arise under degraded visibility conditions, and when there are no other positioning means available to position an aircraft with respect to the runway automatically. There is then a need to confirm, on arrival, that an aircraft making its final approach towards a destination runway of an airport facility is correctly positioned.

The situation can be improved.

SUMMARY

The present invention contemplates providing a method for assisting with landing an aircraft making it possible to confirm the aircraft is correctly positioned with respect to a destination runway of an airport facility, in particular when the latter comprises a plurality of runways, and an automated system for assisting with landing configured to execute such a method.

To this end, a method is provided for assisting with landing an aircraft on a runway of a destination airport facility, the method comprising:

detecting a plurality of runways in an image representative of a shot taken from the aircraft, selecting a detected runway among the plurality of runways detected in the image, and detecting characteristic points of that runway in said image, determining as many theoretical positions of the aircraft as there are runways present in the destination airport facility using the characteristic points of the selected runway in the image, a "PnP" algorithm for determining a position of the aircraft with respect to said runway on the basis of the shot, and the coordinates of the characteristic points of each of the runways in a geodetic database, then, for each of the determined theoretical positions of the aircraft:

reprojecting each of said runways into the image using the determined theoretical position, the coordinates of the geodetic database and the "PnP" algorithm for determining a position of the aircraft with respect to said runway on the basis of the shot, establishing and storing a consistency score rating the consistency between the characteristic points of the runways detected in the image and the characteristic points of the runways reprojected into the image, then delivering information representative of an estimated position of the aeroplane on the basis of the stored consistency scores.

Advantageously, it is thus possible to confirm or disconfirm whether the aircraft is correctly positioned facing a presumed destination runway among a plurality of runways.

According to one embodiment, the step of selecting a runway comprises determining a runway detected as being the most centred of the runways in the image or the one having the highest detection index.

In one embodiment, establishing a consistency (or correlation) score rating the consistency (or correlation) between the characteristic points of the runways detected in the image and the characteristic points of the runways reprojected into the image comprises establishing a consistency index for each pair of runways comprising a runway detected in the image and a runway reprojected into the image, on the basis of a distance between a centroid of the runway detected in the image and a centroid of the runway reprojected into the image, then, determining the consistency score on the basis of the indices.

According to one embodiment, the consistency score is the mean of the indices.

The invention also relates to a device for assisting with landing, comprising electronic circuitry configured to:

detect a plurality of runways in an image representative of a shot taken from the aircraft, select a detected runway among the plurality of runways detected in the image, and determine characteristic points of that runway in said image, determine as many theoretical positions of the aircraft as there are runways in the destination airport facility using the characteristic points of the selected runway in the image, a "PnP" algorithm for determining a position of the aircraft with respect to said runway on the basis of the shot, and the coordinates of the characteristic points of each of the runways in a geodetic database, then, for each of the determined theoretical positions of the aircraft:

reproject each of said runways into the image using the theoretical position, the coordinates of the geodetic database and the "PnP" algorithm for determining a position of the aircraft with respect to said runway on the basis of the shot, establish and store a consistency score rating the consistency between said characteristic points of said runways detected in said image and the characteristic points of the runways reprojected into the image, then, delivering information representative of an estimated position of the aeroplane on the basis of the stored consistency scores.

According to one embodiment, the electronic circuitry configured to establish a consistency score rating the consistency between the characteristic points of the runways detected in the image and the characteristic points of the runways reprojected into the image comprises electronic circuitry configured to establish a consistency index for each pair of runways comprising a runway detected in the image and a runway reprojected into the image, on the basis of a distance between a centroid of the runway detected in the image and a centroid of the runway reprojected into the image, then, determine the consistency score on the basis of the indices.

The invention also relates to an aircraft comprising a device for assisting with landing such as described above.

Lastly, the invention relates to a computer program product comprising program code instructions for executing the steps of a method for assisting with landing such as described above and a storage medium containing a computer program product such as mentioned above.

BRIEF DESCRIPTION OF THE DRAWINGS

The above-mentioned features of the invention, along with others, will become more clearly apparent on reading the following description of one example of embodiment, said description being given with reference to the appended drawings, in which.

DETAILED DESCRIPTION

Some embodiments will now be described with reference to the Figures, like numerals being used to refer to like and corresponding parts of the various drawings.

Figure 1:
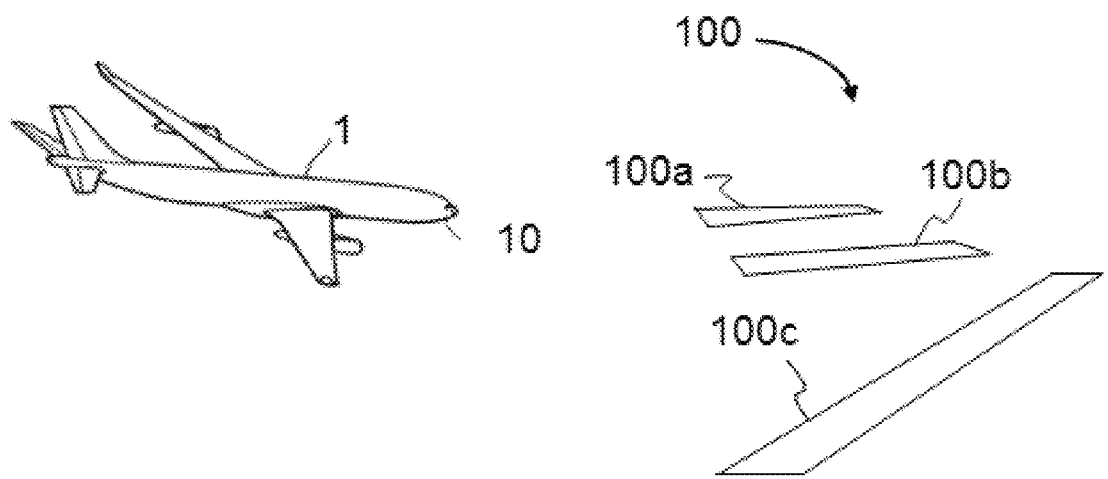
FIG. 1 schematically and symbolically illustrates an aircraft comprising a system for assisting with landing according to one embodiment located facing a destination airport facility.

FIG. 1 schematically and symbolically shows an aircraft 1 comprising a system 10 for assisting with landing configured to execute a method for assisting with landing according to one embodiment of the invention. The system 10 is in particular configured to determine a position of the aircraft 1 with respect to a destination runway 100b on which the aircraft 1 is expected to land imminently. The destination runway 100b is a runway of an airport facility 100. The runway 100b of the airport facility 100 is elongate and rectangular in shape. Advantageously, the destination runway 100b is referenced in a database RWYDB directly or indirectly accessible by the system 10 for assisting with landing the aircraft 1. According to one embodiment, the database RWYDB is downloaded into the assisting system 10 of the aircraft 1, for example prior to a flight.

According to one embodiment, the database RWYDB comprises, for each of the runways of airport facilities listed therein, coordinates of characteristic points of the runway (corners and midpoints of runway thresholds, for example) in a WGS84 format (WGS standing for World Geodetic System). According to one embodiment, the system 10 for assisting with landing is configured to communicate with a remote server, for example a database server installed in a ground station, which comprises the database RWYDB of runways of airport facilities. Advantageously, the aircraft 1 is equipped with at least one front camera 10c (shown in FIG. 2), which is configured to take shots of a sector, called the "front sector" or even the "field of view" or "FOV", toward which the aircraft is heading when it is in flight. Preferably, the front camera 10c is arranged in the radome of the aircraft 1.

According to an exemplary embodiment, the front camera 10c is arranged on any part of the fuselage of the aircraft 1 so long as its position is compatible with shooting the front sector, which sector is furthermore on the whole visible from the cockpit of the aircraft 1. The front camera 10c operates like a conventional image-capturing device, i.e. it is configured to take successive shots and to deliver successive images F each representative of a view of the environment facing the aircraft 1, from the aircraft 1, at the time of shooting. According to one embodiment, the front camera 10c is for example configured to take 30 shots per second and to deliver 30 images F per second to the device 10 for assisting with landing. Advantageously, the camera 10c or even the system 10 for assisting with landing comprises a module for detecting regions of interest that is configured to detect one or more regions of interest visible during shooting, based on one of the corresponding images F. In other words, the module for detecting regions of interest is a module comprising electronic circuitry configured to detect one or more objects (regions of interest) of a given type in an image F obtained from the front camera 10c.

In the described example, the one or more detected objects are runways present in the field of view of the camera 10c. According to one embodiment, the object-detecting module comprises a software or hardware implementation of a deep convolutional neural network (DCNN). Such a DCNN module may consist of a set of many artificial neurons, of convolutional or perceptron type, organized into successive interconnected layers. Such a DCNN module is conventionally inspired by a simplistic model of the operation of a human brain where many biological neurons are connected together by axons. For example, a so-called YOLOv4 module (YOLOv4 standing for You Only Look Once version 4) is a DCNN module that allows objects to be detected in images—it is a so-called "one-stage" module, i.e. its architecture is composed of a single module of combined proposals for object-framing rectangles (or "bounding boxes") and classes of objects in the image. In addition to the artificial neurons described above, the YOLOv4 module uses functions known to those skilled in the art such as batch normalization, dropblock regularization, weighted residual connections, or even a stage of non-maximal suppression that eliminates redundant proposals in respect of detected objects.

According to an exemplary embodiment, the object-detecting module is able to predict a list of objects present in one or more images of one or more videos by providing, for each object, a box bounding the object (taking the form of coordinates of points defining the box in the image), the type or class of the object from a predefined list of classes defined during a learning phase, and a detection score representing a degree of confidence in the detection. Advantageously, the object-detecting module, when fed an image F, is configured to extract coordinates of characteristic points of each of the runways detected in an image F, with reference to the image plane (or image reference frame) of the image F. For example, the object-detecting module of the aircraft 1 is capable of providing coordinates of the four corners of a runway detected in an image F, and of two points defining a longitudinal central axis of the runway in question. The image plane of the front camera 10c is here defined as a plane perpendicular to the optical axis of the front camera 10c and an image delivered by the camera 10c therefore comprises a projection of all the elements seen by the camera into this reference image plane.

Cleverly and advantageously, it is then possible, for any runway characteristic points of which are referenced in a runway geolocation database, to use the coordinates present in the database or even coordinates of points determined from the coordinates present in the database, and the coordinates of the same points of the runway such as detected in an image F obtained using the front camera, to define a position of the aircraft at the time of the shot from which the image F was obtained, by virtue of use of a "perspective-n-point" algorithm to determine a position of the aircraft with respect to said runway on the basis of the shot, "perspective-n-point" algorithms also commonly being referred to as "PnP" algorithms or reprojection algorithms. Such an algorithm is also called an algorithm for computing pose.

The terms "computing pose" here designate determining a position of an aircraft with respect to a spatial reference frame, this potentially meaning determining its position but also its orientation and its attitude (how its axes are positioned in space). It is a question of an algorithm intended in particular to determine the six-DoF relative position (DoF standing for Degrees of Freedom) of a camera (or more precisely of its optical centre) positioned on its optical viewing axis, with respect to a given object in space, and vice versa, on the basis of a set of correspondences between points Mi referenced in a spatial reference frame X, Y, Z and their respective projections mi in an image plane obtained using the camera. Thus, for example, a PnP algorithm for determining a position of the aircraft with respect to said runway on the basis of the shot may define a position of the camera 10c on the basis of the geodetic coordinates of the corners A, B, C, D of the runway 100a and of the coordinates in the image F of the points a, b, c, d that are the representation of the points A, B, C and D in the image F delivered by the front camera 10c.

Figure 2:
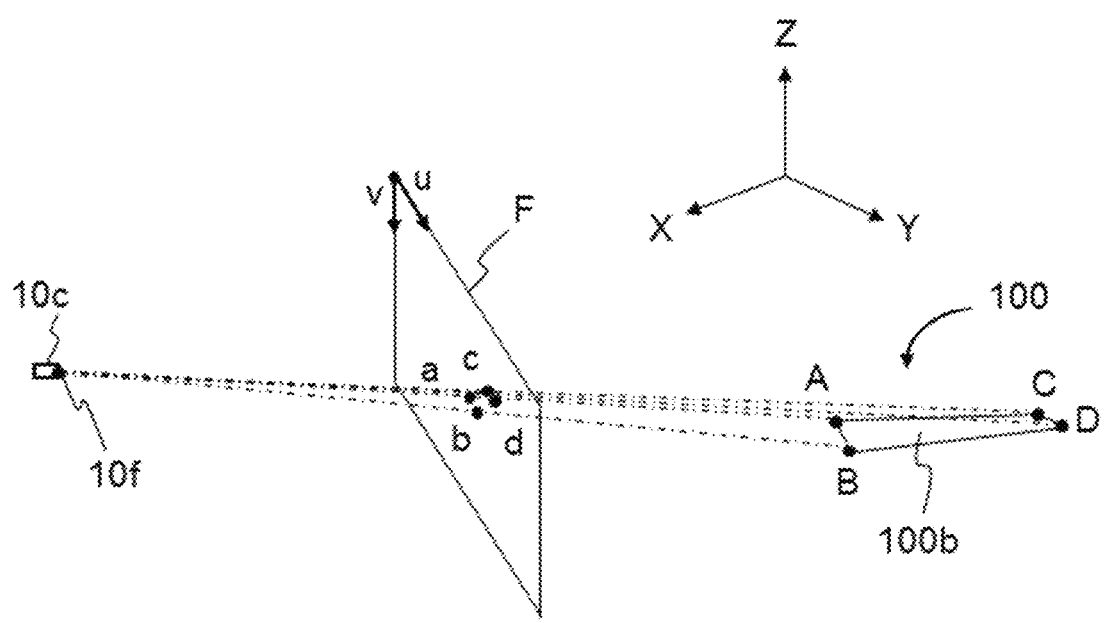
FIG. 2 schematically illustrates a reprojection of a runway into an image plane of a front camera of an aircraft.

FIG. 2 illustrates a relative position of the aircraft 1 facing the destination runway 100b, the four corners of which have been identified and referenced A, B, C, D. FIG. 2 further illustrates an image F such as delivered by the front camera 10c of the aircraft 1 and which contains a representation of the runway 100b detected by the object-detecting module of the aircraft 1 configured to detect one or more runways in the image F delivered by the front camera 10c. The image F contains a representation a, b, c, d, in the system u, v of coordinates of the points of the image F, of the characteristic points A, B, C and D, which are the corners of the runway 100b in the real world. According to one embodiment, geodetic coordinates xA, yA, zA; xB, yB, zB; xC, yC, zC and xD, yD, zD associated with the points A, B, C, D of the runway 100b in the "real world", respectively, are known and stored in the runway database RWYDB with reference to a spatial coordinate system X, Y, Z.

According to an exemplary embodiment, the system 10 for assisting with landing the aircraft 1 is configured to determine a first position of the optical center 10f of the camera 10c, and therefore consequently of the aircraft 1, with respect to the runway 100b by means of a first algorithm, of PnP type. The PnP algorithm executed according to the invention, also referred to here as the algorithm for determining a relative position of the aircraft with respect to a destination runway, or algorithm for computing pose with respect to the destination runway, will not be described in detail because the many computing operations carried out by such an algorithm are known and a detailed description thereof would not aid comprehension of the invention.

Using a PnP algorithm to determine a position of the aircraft with respect to said runway on the basis of the shot therefore makes it possible, from a representation of a runway selected in the image F, and knowing the geodetic coordinates of the characteristic points A, B, C and D of each of the runways 100a, 100b and 100c, to determine as many theoretical positions of the aircraft 1 facing the airport facility 100 as there are runways present in the airport facility 100. Thus, if one of the runways seen by the front camera 10c of the aircraft 1 indeed belongs to the airport facility 100, at least one of the theoretical positions determined by means of the PnP algorithm will be accurate (to within computational errors). In the described example, the runways 100a, 100b and 100c of the airport facility 100 are three in number and it is therefore possible to determine three theoretical positions of the aircraft 1, which are here denoted POS1, POS2 and POS3.

According to one embodiment, a runway detected in the image F (or more exactly a representation of a runway determined in the image F) is selected by choosing the runway that appears most centered in the image F, insofar as it is estimated that, except in special cases, the radionavigation means used are of a nature to allow the aircraft to be positioned on arrival facing the destination runway and on the axis of the destination runway, this meaning that the destination runway will appear centrally in the image F representative of the field of view of the front camera 10c. Obviously, this example is non-limiting and another runway representation could be used.

Figure 3:
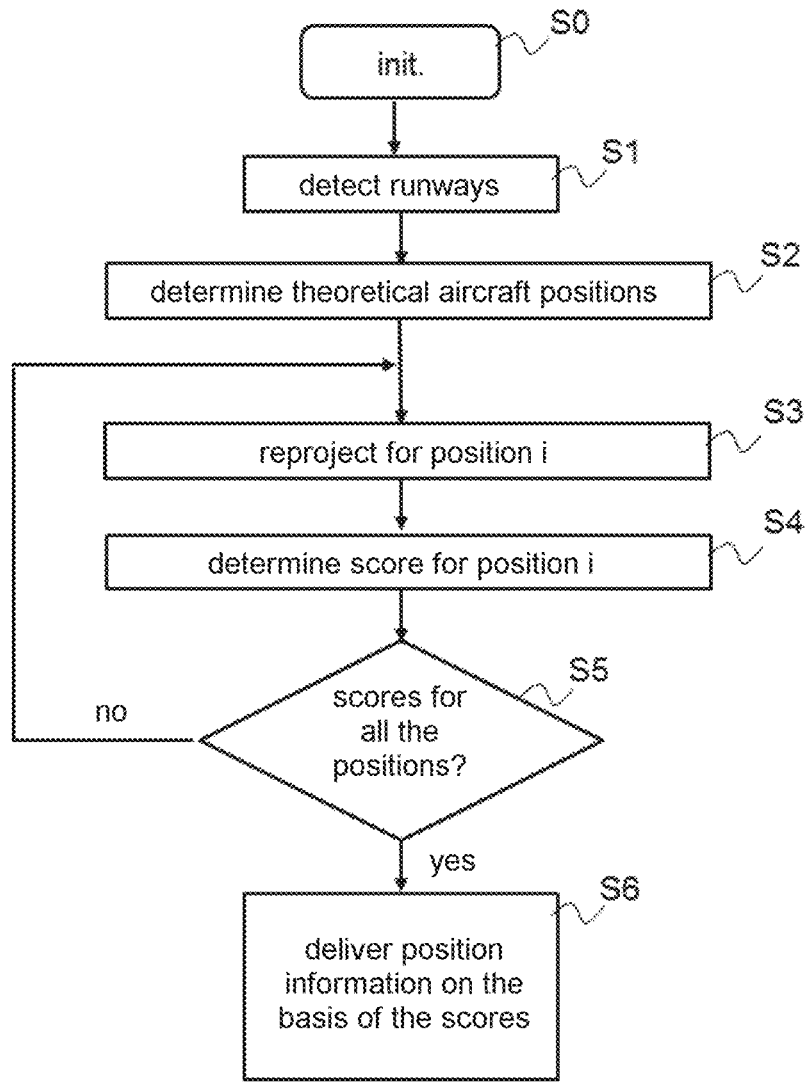
FIG. 3 schematically illustrates a method for assisting with landing according to one embodiment.

FIG. 3 is a flowchart illustrating steps of a method for assisting with landing the aircraft 1 executed by the system 10 for assisting with landing.

An initial step S0 is a step at the end of which all the means implemented by the method are correctly initialized and normally operational. Furthermore, at the end of step S0, the aircraft 1 is sufficiently close to the destination airport facility for a plurality of runways of the airport facility 100 to be present in the field of view of the camera 10c. In the described example, the three runways 100a, 100b and 100c of the airport facility 100 are visible at the end of step S0. The object-detecting module of the aircraft 1 then, in a step S1, detects each of the runways present in the field of view of the camera 10c, so as to be able to identify them via bounding boxes in the image F delivered by the front camera 10c. The theoretical positions POS1, POS2 and POS3 are then determined in a step S2, on the basis of a runway selected in the image F. In the described example, the selected runway is the runway most centered in the image, namely the runway 100b. According to another example, the runway selected is the one for which a confidence index delivered by the module for detecting objects in the image is highest (one index being associated with each bounding box).

According an exemplary embodiment, the step of selecting a runway comprises determining an identifier of the runway (such as, for example, a runway number painted on its runway threshold depending on its orientation). It is possible to determine the destination runway even if the detected runway is not the destination runway because the relative position of all the runways in the airport facility is known. In the described example, the theoretical position POS1 is determined from the geodetic coordinates of the runway 100a in the database RWYDB, the theoretical position POS2 is determined from the geodetic coordinates of the runway 100b in the database RWYDB, and the theoretical position POS3 is determined from the geodetic coordinates of the runway 100c in the database RWYDB. Once the theoretical positions POS1, POS2 and POS3 have been determined by executing a PnP algorithm, steps S3 and S4 are successively carried out as many times as there are determined theoretical positions (so here three times in the described example), i.e. as many times as there are runways present in the airport facility 100. The runways 100a, 100b and 100c are then reprojected in step S3, for each of the determined theoretical positions POS1, POS and POS3, so as to determine a level of consistency, in step S4, between the detected runways 100a, 100b and 100c such as present in the image F, and the runways 100a, 100b and 100c such as reprojected into the image F by means of use of a theoretical camera model (e.g. a pinhole camera model). In step S4, the level of consistency between the detected runways and the reprojected runways is quantified by computing a consistency score for each of the previously determined theoretical positions.

Various diverse methods may be used to determine a consistency score. For example, if a reprojected runway appears entirely within a bounding box of predetermined size defined around a detection bounding box, or centred thereon, a partial score (also called "index" here) determined for that runway is positive, and if the reprojected runway does not appear entirely within a predetermined bounding box, but only partially, the partial score for that runway is zero, and, lastly, if the reprojected runway appears only outside a predetermined bounding box, the partial score for that runway is negative. According to another example of embodiment, establishing a consistency score rating the consistency between the characteristic points a, b, c, d of the runways 100a, 100b and 100c detected in the image F and the equivalent characteristic points of the runways reprojected into the image F comprises establishing a consistency index for each pair of runways comprising a runway detected in the image F and a runway reprojected into the image F, on the basis of a distance between a geometric centroid of the runway detected in the image F and a geometric centroid of the runway reprojected into the image F, then subsequently determining the consistency score on the basis of the indices computed beforehand for each of the runways. Other variants are obviously possible provided that computation of a consistency score is representative of a level of overall consistency between the runways such as reprojected and the runways such as detected. In the described example, a consistency score SC is determined from indices SC1, SC2 and SC3 associated with pairs of detected and reprojected runways, respectively.

A step S5 aims, after each successive iteration of steps S3 and S4, to determine whether a consistency score SC has indeed been determined for all the runways of the airport facility 100 or, in other words, for all the determinable theoretical positions (here POS1, POS2 and POS3) of the aircraft 1 facing the airport facility 100, using a theoretical camera model (e.g. the pinhole camera model) for the reprojections.

If a consistency score SC has been determined for all the runways in step S5, the method then delivers, in a step S6, information POSA on the estimated position of the aircraft, on the basis of the consistency scores SC determined for the various theoretical positions POS1, POS2 and POS3, respectively. Otherwise, the method loops back to step S3 with a view to performing a new iteration of steps S3 and S4 for a position (and therefore a runway) not yet processed by these steps. According to one embodiment, the final estimated position information POSA is the theoretical position for which the highest consistency score SC is obtained among the consistency scores SC associated with the stored theoretical positions POS1, POS2 and POS3. Specifically, at least one of the determined theoretical positions POS1, POS2 and POS3 is the position of the aircraft at the time of the shot that generated the image F since, unless an error is made in identifying the airport facility visible from the front camera, the runway detected in the image F then selected to determine the theoretical positions POS1, POS2 and POS3 definitely corresponds to one of the runways of the airport facility 100. It is unlikely that an error will be made in identifying the airport facility visible from the aircraft if radionavigation or visual landmarks have been able to be used to approach the aircraft to the destination airport facility 100. FIG. 4, FIG. 5, FIG. 6, FIG. 7, FIG. 8 and FIG. 9 are intended to illustrate the detection and reprojection operations performed during execution of the method described above with reference to the flowchart of FIG. 3.

According to an exemplary embodiment, each of said runways is reprojected into the image F using the determined theoretical position, the coordinates of the geodetic database and a theoretical camera model such as for example a pinhole camera model, then a consistency (or correlation) score rating the consistency (or correlation) between the region of the image F containing the runways obtained through a reprojection using the theoretical camera model once the theoretical position of the airplane has been determined, and reconstructed synthetic images of the corresponding runways of the airport facility, is established and stored, then information representative of an estimated position of the aircraft is delivered on the basis of the stored consistency scores.

Figure 4:
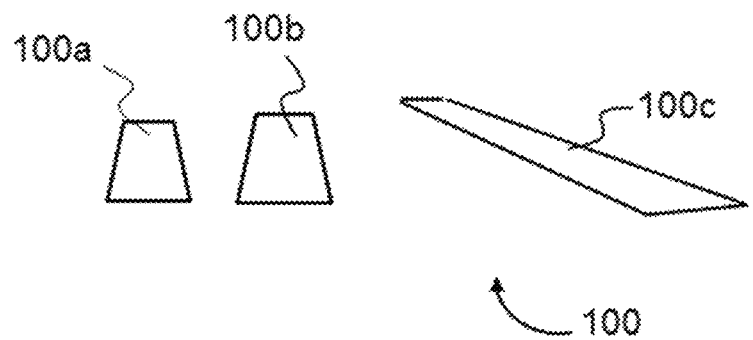
FIG. 4 schematically illustrates a shot of three runways of a given airport facility taken by a front camera of an aircraft.

FIG. 4 schematically illustrates the field of view (or FOV) seen from the front camera of the aircraft 1 on its final approach towards the airport facility 100. The runways 100a, 100b and 100c are therefore visible in the field of view of the camera 10c, centered along a viewing axis of the camera 10c. More broadly, other elements of the airport facility 100 are visible in the field of view of the camera 10c, but have not been shown in the figures, for the sake of simplicity. Such unshown elements are, for example, airport buildings and concourses, one or more control towers, equipment inherent to the operation and servicing of an airport facility (fire station, roads, telecommunication equipment, radars, etc.) and aircraft and land vehicles.

Figure 5:
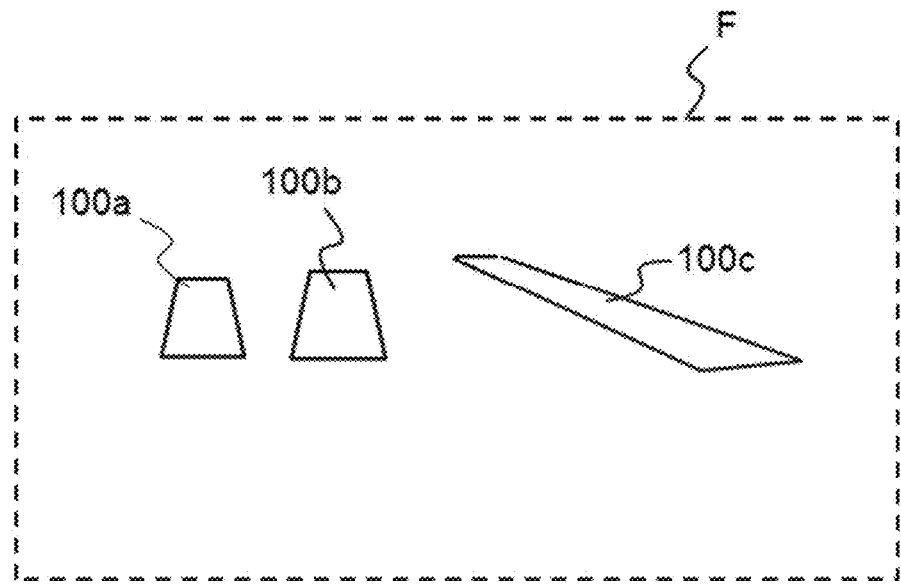
FIG. 5 schematically illustrates the three runways already shown in FIG. 4 in an image delivered by the front camera that took the shot of FIG. 4.

FIG. 5 shows an image F such as resulting from a shot taken by the front camera 10c then delivered by the latter. Thus, the image F contains a representation of the runways present in the field of view, provided that the visibility conditions between the aircraft 1 and each of the runways allow it. In the case where the visibility conditions do not allow a representation of all the runways present in the field of view of the camera 10c, for example because of local cloud, the runway selected for the determination of as many theoretical positions of the aircraft as there are listed runways in the airport facility 100 will be chosen by selecting a runway visible in the image F. It is therefore entirely possible to establish the position of the aircraft with respect to the destination runway even if the latter is not visible, provided that other runways of the airport are. Obviously, if no runway is visible in the image F, the method cannot be executed.

Figure 6:
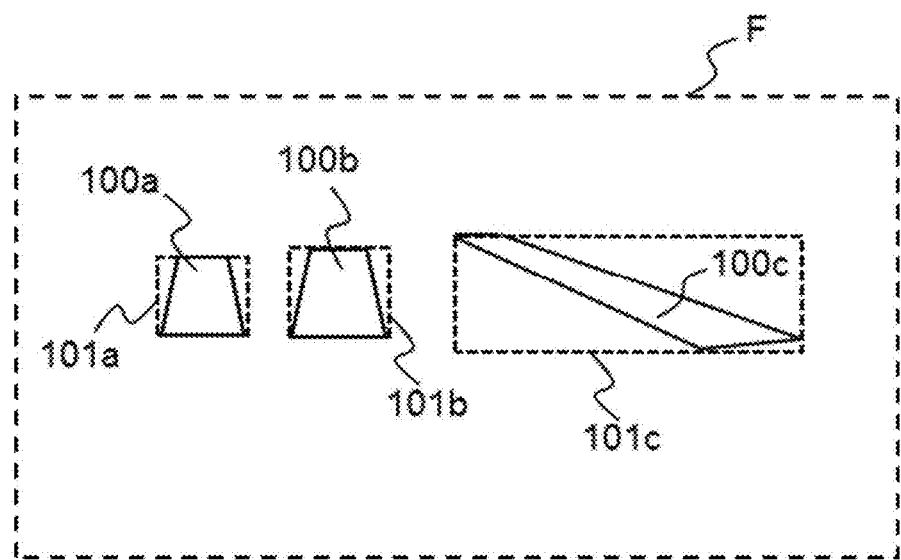
FIG. 6 schematically illustrates detection of objects of runway type identified by bounding boxes in the image already shown in FIG. 5.

FIG. 6 illustrates the result of an object-detecting module having performed detection of objects of runway type on the image F. Bounding boxes 101a, 101b and 101c make it possible to identify in the image F the detected runways 100a, 100b and 100c, respectively.

Figure 7:
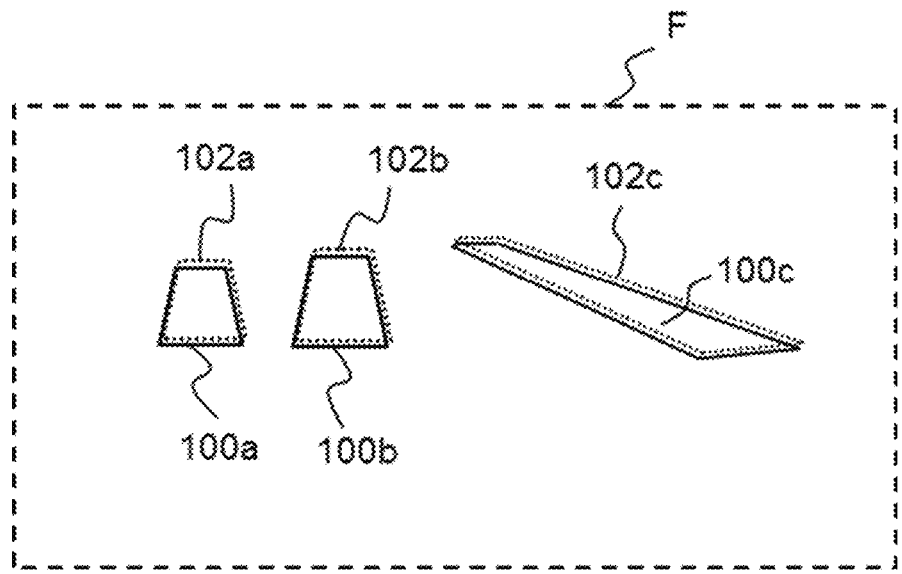
FIG. 7 schematically illustrates reprojection of the runways of the airport facility already shown in FIG. 1 into the image already illustrated in FIG. 5 and FIG. 6, from a first determined theoretical position of the aircraft.
Figure 8:
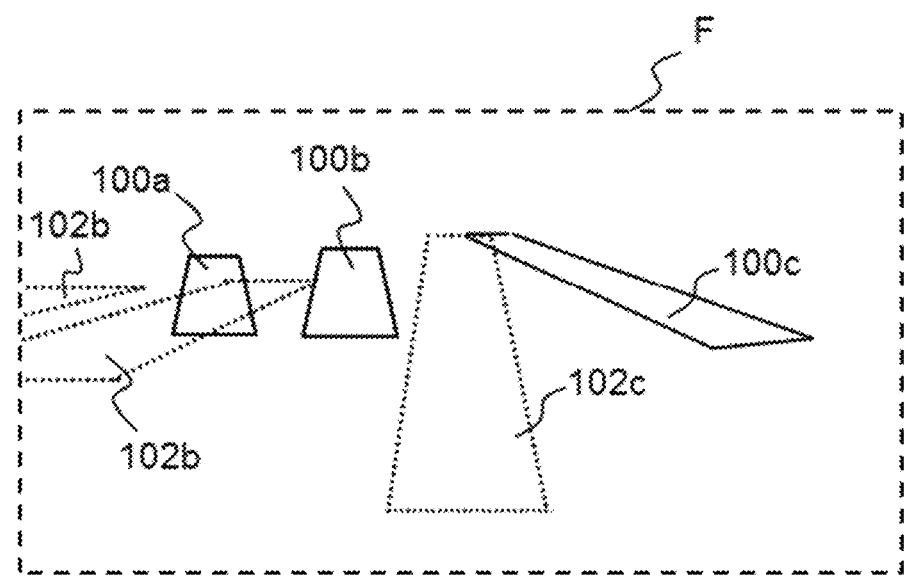
FIG. 8 schematically illustrates reprojection of the runways of the airport facility already shown in FIG. 1 into the image already illustrated in FIG. 5 and FIG. 6, from a second determined theoretical position of the aircraft.
Figure 9:
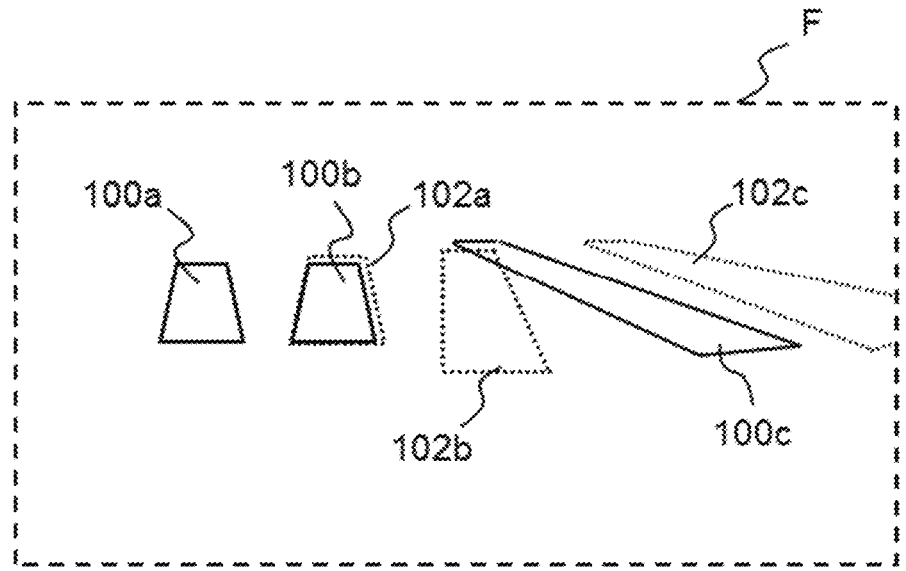
FIG. 9 schematically illustrates reprojection of the runways of the airport facility already shown in FIG. 1 into the image already illustrated in FIG. 5 and FIG. 6, from a third determined theoretical position of the aircraft; and, FIG. 10 schematically illustrates an internal architecture of a device for assisting with landing according to one embodiment.

FIG. 7, FIG. 8, and FIG. 9 illustrate the runways 100a, 100b and 100c reprojected into the image F while successively considering the various theoretical positions POS2, POS3 and POS1 of the aircraft 1.

FIG. 7 illustrates a reprojection of the runways 100a, 100b and 100c from the theoretical position POS2 previously determined in step S2. The runway representation 102a is the reprojection of the runway 100a; the runway representation 102b is the reprojection of the runway 100b and the runway representation 102c is the reprojection of the runway 100c. According to one embodiment, the greater the consistency, the higher the determined consistency score SC and vice versa.

It is possible to observe a good overall consistency between the runway reprojections 102a, 102b and 102c with the runways 100a, 100b and 100c detected and the consistency score SC determined for this theoretical position POS2 is high.

FIG. 8 illustrates a reprojection of the runways 100a, 100b and 100c from the theoretical position POS3 previously determined in step S2. The runway representation 102a is the reprojection of the runway 100a; the runway representation 102b is the reprojection of the runway 100b and the runway representation 102c is the reprojection of the runway 100c. It is possible to observe a very poor overall consistency between the runway reprojections 102a, 102b and 102c with the runways 100a, 100b and 100c detected and the consistency score SC determined for this theoretical position POS3 in step S4 is therefore much lower than that determined for the theoretical position POS2.

FIG. 9 illustrates a reprojection of the runways 100a, 100b and 100c from the theoretical position POS1 previously determined in step S2. The runway representation 102a is the reprojection of the runway 100a; the runway representation 102b is the reprojection of the runway 100b and the runway representation 102c is the reprojection of the runway 100c. Just as for the situation described above with reference to FIG. 8, it is possible to observe, in FIG. 9, a very poor overall consistency between the runway reprojections 102a, 102b and 102c with the runways 100a, 100b and 100c detected and the consistency score SC determined in step S4 for this theoretical position POS1 is therefore also much lower than that determined for the theoretical position POS2.

Thus, the system for assisting with landing is cleverly configured to determine an estimated position POSA of the aircraft and to ultimately confirm or disconfirm whether the aircraft is correctly positioned facing the destination runway 100b that it is intended to land on.

Figure 10:
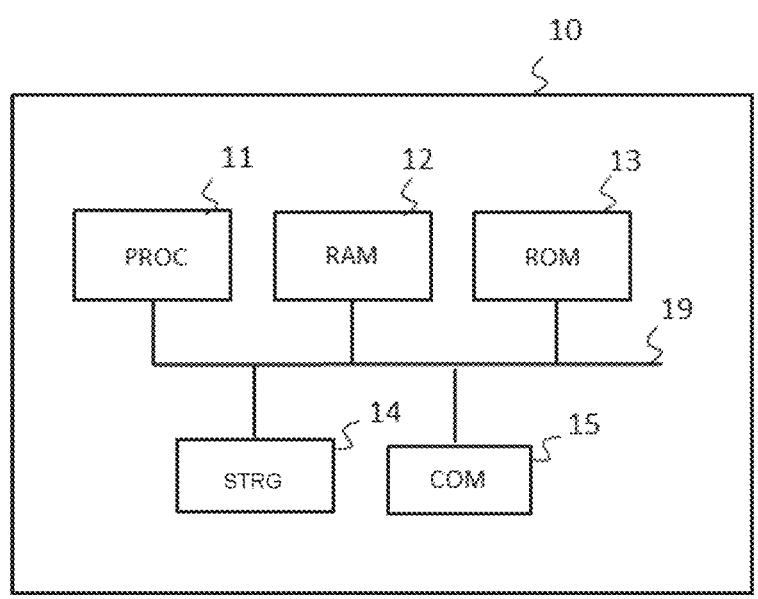

FIG. 10 is a schematic representation of an example of the internal architecture of the system 10 for assisting with landing, also referred to here as the device 10 for assisting with landing. By way of illustration, FIG. 10 will be considered to illustrate an internal arrangement of the system 10 for assisting with landing such as embedded in the aircraft 1. It will be noted that FIG. 10 could also schematically illustrate an example of the hardware architecture of the system 10 for assisting with landing in a configuration in which the system 10 for assisting with landing is external to the aircraft 1 and communicates with the latter via one or more wireless communication links.

In the hardware-architecture example shown in FIG. 10, the system 10 for assisting with landing then comprises, connected by a communication bus 19: a processor or CPU (acronym of Central Processing Unit) 11; a random-access memory (RAM) 12; a read-only memory (ROM) 13; a storage unit such as a hard disk (or a storage-medium reader such as an SD card reader (SD standing for Secure Digital)) 14; a communication-interface module 15 allowing the system 10 for assisting with landing to communicate with remote devices, such as other embedded systems of the aircraft 1 (these including the front camera 10c and a database server) or even such as the aircraft 1, as the case may be.

The processor 11 of the system 10 for assisting with landing is capable of executing instructions loaded into the RAM 12 from the ROM 13, from an external memory (not shown), from a storage medium (such as an SD card), or from a communication network. When the system 10 for assisting with landing is powered up, the processor 11 is capable of reading instructions from the RAM 12 and of executing them. These instructions form a computer program that causes the processor 11 to implement all or part of a method for assisting with landing such as described with reference to FIG. 3 or of described variants of this method.

All or part of the method described with reference to FIG. 3 or its described variants may be implemented in software form through execution of a set of instructions by a programmable machine, for example a digital signal processor (DSP) or a microcontroller, or may be implemented in hardware form by a dedicated machine or component, for example a field-programmable gate array (FPGA) or an application-specific integrated circuit (ASIC). In general, the system 10 for assisting with landing comprises electronic circuitry configured to implement the methods described in relation thereto. Of course, the system 10 for assisting with landing further comprises all the elements that are usually present in a system comprising a control unit and its peripherals, such as, a power-supply circuit, a power-supply-monitoring circuit, one or more clock circuits, a zeroing circuit, input/output ports, interrupt inputs, and bus drivers, this list being non-exhaustive.

The invention claimed is:

1. A method for assisting with landing an aircraft on a runway of a destination airport facility, comprising:
   detecting a plurality of runways in an image (F) representative of a shot taken from the aircraft,
   selecting a detected runway among said plurality of runways detected in said image (F), and determining characteristic points (a, b, c, d) of that runway in said image (F),
   determining as many theoretical positions (POS1, POS2, POS3) of the aircraft as there are runways in said destination airport facility using the characteristic points (a, b, c, d) of the selected runway in said image (F), a "PnP" algorithm for determining a position of the aircraft with respect to said runway on the basis of the shot (F), and the coordinates of said characteristic points (A, B, C, D) of each of the runways in a geodetic database (RWYDB), then, for each of the determined theoretical positions (POS1, POS2, POS3) of the aircraft:
      reprojecting each of said runways into said image (F) using said theoretical position (POS1, POS2, POS3), said coordinates of said geodetic database (RWYDB) and said "PnP" algorithm for determining a position of the aircraft with respect to said runway on the basis of the shot,
      establishing and storing a consistency score (SC) rating the consistency between said characteristic points of said runways detected in said image (F) and said characteristic points of said runways reprojected into said image (F), then
   delivering information (POSA) representative of an estimated position of the airplane on the basis of the stored consistency scores.

2. The method for assisting with landing an aircraft according to claim 1, wherein the step of selecting a runway comprises determining a runway detected as being the most centered of said runways in said image (F) or the one having the highest detection index.

3. The method for assisting with landing an aircraft according to claim 1, wherein establishing a consistency score (SC) rating the consistency between said characteristic points (a, b, c, d) of said runways detected in said image (F) and said characteristic points of said runways reprojected into said image (F) comprises establishing a consistency index for each pair of runways comprising a runway detected in said image (F) and a runway reprojected into said image (F), on the basis of a distance between a centroid of said runway detected in said image (F) and a centroid of said runway reprojected into said image (F), then, determining said consistency score on the basis of said indices.

4. The method for assisting with landing an aircraft according to claim 3, wherein said consistency score is the mean of said indices.

5. A computer program product comprising program code instructions for executing the steps of a method according to claim 1, when said instructions are executed by a processor of a device for assisting with landing an aircraft.

6. A non-transitory computer readable storage device containing a computer program product according to claim 5.

7. A device for assisting with landing, comprising electronic circuitry configured to:
   detect a plurality of runways in an image (F) representative of a shot taken from the aircraft (1) and determine characteristic runway points (a, b, c, d) for each of said runways detected in said image (F),
   select a detected runway among said plurality of runways detected in said image (F),
   determine as many theoretical positions (POS1, POS2, POS3) of the aircraft (1) as there are runways in said destination airport facility using the characteristic points (a, b, c, d) of the selected runway in said image (F), a "PnP" algorithm for determining a position of the aircraft with respect to said runway on the basis of the shot, and the coordinates of said characteristic points (A, B, C, D) of each of the runways in a geodetic database (RWYDB), then, for each of the determined theoretical positions (POS1, POS2, POS3) of the aircraft:
      reproject each of said runways into said image (F) using said theoretical position (POS1, POS2, POS3), said coordinates of said geodetic database (RWYDB) and said "PnP" algorithm for determining a position of the aircraft with respect to said runway on the basis of the shot,
      establish and store a consistency score (SC) rating the consistency between said characteristic points (a, b, c, d) of said runways detected in said image (F) and said characteristic points of said runways reprojected into said image, then
   deliver information (POSA) representative of an estimated position of the airplane on the basis of the stored consistency scores.

8. A device for assisting with landing an aircraft according to claim 7, wherein the electronic circuitry configured to establish a consistency score (SC) rating the consistency between said characteristic points (a, b, c, d) of said runways detected in said image (F) and said characteristic points of said runways reprojected into said image (F) comprises electronic circuitry configured to establish a consistency index for each pair of runways comprising a runway detected in said image (F) and a runway reprojected into said image (F), on the basis of a distance between a centroid of said runway detected in said image (F) and a centroid of said runway reprojected into said image (F), then, determine said consistency score on the basis of said indices.

9. A device for assisting with landing an aircraft according to claim 7, wherein establishing a consistency score (SC) rating the consistency between said characteristic points (a, b, c, d) of said runways detected in said image (F) and said characteristic points of said runways reprojected into said image (F) comprises establishing a consistency index for each pair of runways comprising a runway detected in said image (F) and a runway (102a, 102b, 102c) reprojected into said image (F), on the basis of a distance between a centroid of said runway detected in said image (F) and a centroid of said runway reprojected into said image (F), then, determining said consistency score on the basis of said indices.

10. An aircraft comprising a device for assisting with landing according to claim 7.

* * * * *